United States Patent
Lin et al.

(10) Patent No.: US 8,857,877 B2
(45) Date of Patent: Oct. 14, 2014

(54) RECONFIGURABLE END-EFFECTOR ATTACHABLE TO A ROBOTIC ARM

(75) Inventors: Yhu-Tin Lin, Rochester Hills, MI (US); Andrew L. Bartos, Clarkston, MI (US); Roland J. Menassa, Macomb, MI (US); Hyunshik Shin, Incheon (KR); Shinho Kang, Incheon (KR); Yong-Hyun Ju, Bucheon (KR); Ki-Beom Kim, Incheon (KR); Sang-Yul Ju, Bucheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 760 days.

(21) Appl. No.: 13/100,368

(22) Filed: May 4, 2011

(65) Prior Publication Data

US 2012/0280527 A1     Nov. 8, 2012

(51) Int. Cl.
*B25J 17/02* (2006.01)
*B25J 15/00* (2006.01)
*B25J 9/04* (2006.01)
*B25J 15/06* (2006.01)
*B65G 47/91* (2006.01)

(52) U.S. Cl.
CPC ............ *B25J 15/0061* (2013.01); *Y10S 901/40* (2013.01); *B25J 9/04* (2013.01); *Y10S 901/30* (2013.01); *B25J 15/0052* (2013.01); *B25J 15/0616* (2013.01); *B65G 47/91* (2013.01); *Y10S 901/14* (2013.01); *Y10S 901/19* (2013.01); *Y10S 901/23* (2013.01)
USPC ............... 294/213; 294/65; 269/71; 414/729; 414/735; 414/736; 414/737; 901/14; 901/19; 901/23; 901/30; 901/40

(58) Field of Classification Search
CPC . B25J 15/0052; B25J 15/0616; Y10S 901/30; Y10S 901/40
USPC ............ 414/680, 729, 735, 736, 737; 901/30, 901/40; 294/65, 213; 269/71
See application file for complete search history.

(56) References Cited

U.S. PATENT DOCUMENTS

| | | | |
|---|---|---|---|
| 4,770,456 A | 9/1988 | Phillips et al. | |
| 5,024,575 A * | 6/1991 | Anderson | 414/627 |
| 5,777,267 A | 7/1998 | Szydel | |
| 5,833,147 A | 11/1998 | Fuhlbrigge | |
| 5,909,998 A * | 6/1999 | Herbermann et al. | 414/752.1 |
| 6,471,189 B2 | 10/2002 | Karlinger | |
| 7,309,204 B2 * | 12/2007 | Dorner et al. | 414/737 |
| 7,422,031 B2 | 9/2008 | Benson et al. | |
| 7,575,408 B2 * | 8/2009 | Tominaga | 414/416.08 |
| 7,622,001 B2 | 11/2009 | Inada et al. | |

(Continued)

FOREIGN PATENT DOCUMENTS

JP     2007 105813 A     4/2007

*Primary Examiner* — Scott Lowe

(57) ABSTRACT

A reconfigurable end-effector attachable to a robotic arm, includes a master boom, a first branch assembly and a second branch assembly, a dual articulation mechanism. The dual articulation mechanism includes a first clutch attached to the first branch assembly and is configured to articulate the first branch assembly relative to the second branch assembly. The dual articulation mechanism further includes a second clutch attached to the master boom, the second branch assembly and the first clutch and is configured to simultaneously articulate the first and second branch assemblies relative to the master boom. The first and second branch assemblies each have limbs connected to branches supporting a plurality of tool modules. Each tool module includes an end element configurable to interact with a workpiece.

17 Claims, 5 Drawing Sheets

(56) References Cited

U.S. PATENT DOCUMENTS

| | | |
|---|---|---|
| 7,790,984 B2 | 9/2010 | Choi |
| 8,172,210 B2 * | 5/2012 | Jeon ................................ 269/21 |
| 8,496,425 B2 * | 7/2013 | Lin et al. ........................ 414/729 |
| 2004/0041422 A1 * | 3/2004 | Nakamura ...................... 294/65 |
| 2006/0291951 A1 * | 12/2006 | Van Zile et al. ................. 403/97 |
| 2009/0194922 A1 | 8/2009 | Lin et al. |
| 2009/0288458 A1 * | 11/2009 | Lin et al. ......................... 70/174 |
| 2009/0292298 A1 * | 11/2009 | Lin et al. ....................... 606/130 |
| 2010/0140969 A1 | 6/2010 | Lin et al. |
| 2010/0180711 A1 | 7/2010 | Kilibarda et al. |
| 2010/0234994 A1 | 9/2010 | Shi |

* cited by examiner

RECONFIGURABLE END-EFFECTOR ATTACHABLE TO A ROBOTIC ARM

TECHNICAL FIELD

This disclosure is related to end-effectors for use with robotic arms.

BACKGROUND

The statements in this section merely provide background information related to the present disclosure and may not constitute prior art.

Known end-effectors attached to robotic apparatuses are used to manipulate a workpiece during manufacturing processes. Applications of robotic apparatuses with end-effectors may encompass material handling, manufacturing, packaging, and testing. An end-effector includes tool modules that grip a workpiece, transport the workpiece to a new location, and orient and release the workpiece. The end-effector is preferably adjustable to permit use with workpieces of multiple designs, including adjusting the tool modules. It is known to adjust an end-effector for use with workpieces of multiple designs by manually adjusting locations and orientations of the tool modules. Manually adjusting tool modules is known to consume time and may be prone to errors.

Known workpieces handled by an end-effector include parts or sheet metal panels that are shaped in three-dimensional forms and have large changes of slope and elevation. It may be impractical to design an end-effector with excessively large height extension and swivel angle for tool modules that self-conform to a workpiece.

An end-effector may be connected to a robotic arm with a master boom and adapter to move a workpiece into and out of an associated processing station such as a stamping machine and associated dies. A flat end-effector frame with a straight boom may interfere with the dies and machine frames during movement of a workpiece due to limitations in machine workspaces, e.g., die opening dimensions and three-dimensional die shapes.

End-effectors include dress packages that house and route conduits to each of the tool modules to conduct power, in the form of vacuum, compressed air, hydraulic fluids, and electricity to activate and deactivate vacuum cups, mechanical grippers, or other workpiece interface tools that are mounted on the ends of the tool modules. Known dress packages are tie-wrapped or otherwise attached onto the frame of the end-effector. A change or reconfiguration of a tool module on an end-effector requires releasing the tie-wraps to effect such a change. Other known dress packages for tool modules mounted on end-effectors include the hoses loosely held with some slackness for adjustment or movement of gripping components. Hoses and power cables designed to permit a wide range of motion of one of the tool modules may tangle and interfere with other hoses and power cables. Issues related to dress packaging include permitting setup flexibility for the end-effector and the tool modules, uninterrupted mobility of the end-effector during operation, machine setup time during reconfiguration for a workpiece, and maintainability during life of the equipment.

SUMMARY

A reconfigurable end-effector attachable to a robotic arm, includes a master boom, a first branch assembly and a second branch assembly, a dual articulation mechanism. The dual articulation mechanism includes a first clutch attached to the first branch assembly and is configured to articulate the first branch assembly relative to the second branch assembly. The dual articulation mechanism further includes a second clutch attached to the master boom, the second branch assembly and the first clutch and is configured to simultaneously articulate the first and second branch assemblies relative to the master boom. The first and second branch assemblies each have limbs connected to branches supporting a plurality of tool modules. Each tool module includes an end element configurable to interact with a workpiece.

BRIEF DESCRIPTION OF THE DRAWINGS

One or more embodiments will now be described, by way of example, with reference to the accompanying drawings, in which.

DETAILED DESCRIPTION

Figure 1:
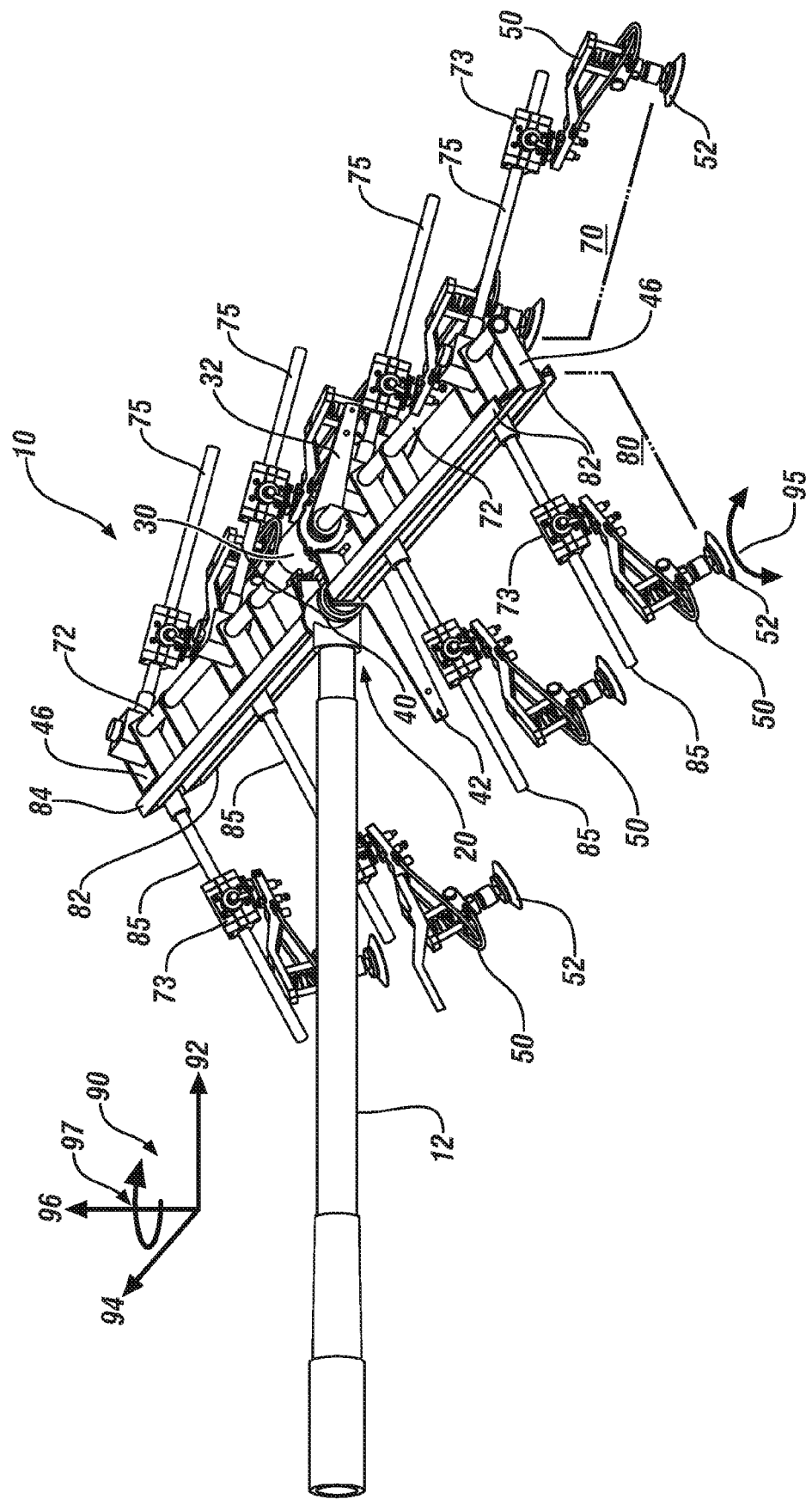
FIGS. 1 and 2 is three-dimensional illustrations of portions of a reconfigurable end-effector including a plurality of configurable tool modules in accordance with the disclosure.
Figure 2:
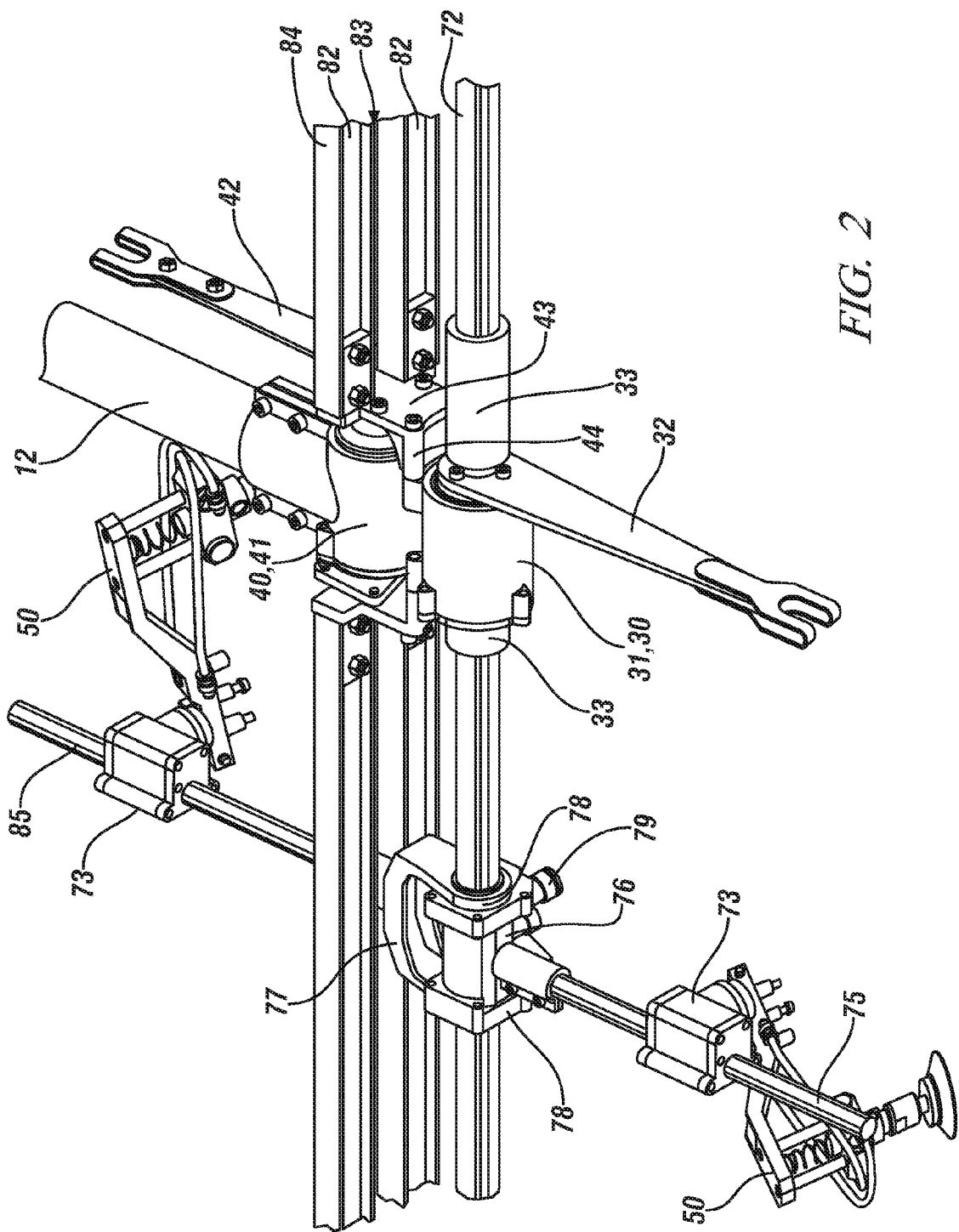

Referring now to the drawings, wherein the showings are for the purpose of illustrating certain exemplary embodiments only and not for the purpose of limiting the same, FIGS. 1 and 2 provide three-dimensional illustrations of a reconfigurable end-effector 10 including a plurality of configurable tool modules 50 each having an end element 52 swivelably attached thereto. The end-effector 10 preferably attaches to a free end of an articulable robotic arm or another material handling device. In one embodiment, the robotic arm includes a programmable device fixed to a base and operative to linearly and rotationally translate the end-effector 10 in space. A spatial coordinate system described with reference to an x-y-z reference coordinate system 90 including x-axis 92, y-axis 94, and z-axis 96 provides position reference for the end-effector 10 and attached tool modules 50. The end-effector 10 is preferably machine-adjusted to a preferred configuration, which defines location of each of the tool modules 50 in relation to the x-y-z coordinate system 90.

The reconfigurable end-effector 10 includes a first branch assembly 70 located in a nominal front position (as shown) and a second branch assembly 80 located in a nominal rear position (as shown). The first and second branch assemblies 70, 80 each structurally support one or a plurality of tool modules 50. The first and second branch assemblies 70, 80 are preferably arranged in spider-frame configurations. A spider-frame configuration includes a limb having one or more branches providing the structural support for the tool modules 50, wherein the branches are attached to the limb element in a cantilever fashion. As described herein, the first and second branch assemblies 70, 80 are moveable and may be arranged in any of a convex configuration, a concave configuration, or a flat configuration to permit the end element 52 of each of the tool module(s) 50 to attach to or interact with a workpiece. As such the articulable robotic arm may employ the reconfigurable end-effector 10 to physically move a workpiece or perform an operation on a workpiece, depending upon specific operating scheme of the tool module(s) 50.

The end-effector 10 includes a master boom 12 and a dual articulation mechanism 20 for articulating the first and second branch assemblies 70, 80. The dual articulation mechanism 20 includes a first rotary clutch mechanism 30 that is articulated using a first input lever 32 and a second rotary clutch mechanism 40 that is articulated using a second input lever 42. A longitudinal centerline of the master boom 12 defines the x-axis 92 of the x-y-z reference coordinates 90.

The first branch assembly 70 attaches to the first rotary clutch mechanism 30. The first branch assembly 70 includes a pair of limbs 72 that project from the master boom 12 in opposite directions, preferably orthogonal to its longitudinal axis. Longitudinal projections of the limbs 72 preferably define the y-axis 94 of the of x-y-z reference coordinates 90. The z-axis 96 is defined perpendicular to a plane defined by the x-axis 92 and the y-axis 94. One or a plurality of front branches 75 project from the limbs 72, preferably orthogonally. The front branches 75 are configured to rotate with rotation of the limbs 72. The pair of limbs 72 are preferably linked to rotate in concert with each other through the first rotary clutch mechanism 30.

The second branch assembly 80 attaches to the second rotary clutch mechanism 40. The second branch assembly 80 includes a pair of guide rails 82 that project from the master boom 12 in opposite directions, preferably orthogonal to its longitudinal axis and parallel to the limbs 72 of the first branch assembly 70. One or a plurality of rear branches 85 attach to the limbs 72, preferably orthogonally, and project through a slot 83 formed between beam elements 84 in the guide rails 82. The rear branches 85 are configured to rotate with rotation of the guide rails 82. The guide rails 82 are preferably linked to rotate in concert with each other through the second rotary clutch mechanism 40. The front branches 75 and rear branches 85 are fabricated from suitable material and include one or a plurality of longitudinal splines. Each of the front branches 75 and rear branches 85 has at least one tool module 50 slidably mounted thereon. Ends of the limbs 72 distal to the first rotary clutch mechanism 30 couple to corresponding ends of the pair of guide rails 82 distal to the second rotary clutch mechanism 40 using end brackets 46. Preferably the end brackets 46 are fixedly connected to the ends of the pair of guide rails 82 and rotatably connected to the ends of the limbs 72, thus permitting the limbs 72 to rotate therein.

Each tool module 50 is mounted onto a linear/rotary locking mechanism 73 that slidably mounts on one of the front and rear branches 75, 85, and interacts with the longitudinal splines thereof to prevent rotation about a longitudinal axis of the respective branch 75, 85. The linear/rotary locking mechanism 73 is configured to translate on the respective branch 75, 85 when unlocked and to secure the tool module 50 at a preferred location along the length of the respective branch 75, 85 when locked. Each linear/rotary locking mechanism 73 is preferably pneumatically activated, is preferably configured to remain in a locked position until unlocked, and may be unlocked when compressed air is injected. The linear/rotary locking mechanism 73 may instead be mechanically activated and deactivated. Each tool module 50 includes a swing-arm assembly that allows the tool module 50 to be reconfigured in preferred positions to interact with different workpieces.

Each tool module 50 preferably has five degrees of freedom (5-d.o.f.) of movement, and is configurable to a suitable position defined with reference to an x-axis position, a y-axis position, a z-axis position, a rotational angle $\phi 97$ about the z-axis of the x-y-z coordinate system 90, and a swivel angle $\alpha 95$, which defines a position of the end element 52 relative to the respective tool module 50.

FIG. 2 illustrates a portion of the reconfigurable end-effector 10 including the master boom 12, the dual articulation mechanism 20 with first and second rotary clutch mechanisms 30 and 40 having respective limbs 72 and guide rails 82 attached thereto. The first and second rotary clutch mechanisms 30 and 40 are preferably lockable bidirectional devices that employ wedging or another suitable mechanism to effect locking.

The second bidirectional rotary clutch 40 includes a second housing 41 that is fixedly attached to an end of the master boom 12 and is distal from an end of the master boom 12 that couples to the robotic arm.

The second bidirectional rotary clutch 40 includes a bidirectional clutching mechanism encased in the second housing 41 with a moveable output shaft 43 that extends on either end of the second housing 41 and is coupled to the second input lever 42. Two guide rail brackets 44 are coupled to and thus rotate with rotation of the output shaft 43 of the second bidirectional rotary clutch 40 and the guide rails 82 that extend from each of the guide rail brackets 44.

The first bidirectional rotary clutch 30 includes a first bidirectional clutching mechanism encased in the first housing 31 with a moveable output shaft 33 that extends on either end the first housing 31 and is rotatable using the first input lever 32. The first housing 31 of the rotary clutch 30 is rigidly connected to the two guide rail brackets 44 that are coupled to and rotate with rotation of the output shaft 43 of the second clutch 40. The output shaft 33 fixedly couples to and is configured to rotate the limbs 72 by manipulating the first input lever 32.

Rotating the first lever 32 rotates only the first branch assembly 70 by rotating the limbs 72 including the front branches 75. Thus, the first clutch 30 is employable to articulate the first branch assembly 70 relative to the second branch assembly 80. The first rotary clutch mechanism 30 acts to lock the rotational position and thus hold the first branch assembly 70 in place relative to the second branch assembly 80.

Rotating the second input lever 42 simultaneously rotates the first and second branch assemblies 70 and 80 relative to the boom 12 by rotating the output shaft 43 of the second clutch 40, which rotates the two guide rail brackets 44 and the guide rails 82, and also rotates the first rotary clutch 30 with the limbs 72 and the front branches 75. Thus, the second clutch 40 is employable to articulate the first and second branch assemblies 70, 80 relative to the master boom 12. The second rotary clutch mechanism 40 acts to lock the rotational positions and thus hold the first and second branch assemblies 70, 80 in place relative to the master boom 12.

The first and second input levers 32 and 42 may be moved independently to articulate the first and second assemblies 70 and 80 of the reconfigurable end-effector 10 to achieve a preferred configuration, including one of a convex, concave or flat configuration. When the first and second input levers 32 and 42 are placed in nominal neutral positions, the first and second assemblies 70 and 80 of the reconfigurable end-effector 10 may be used with workpieces having substantially flat profiles. When the second input lever 42 is rotated in a first, e.g., counterclockwise direction, and the first input lever 32 is rotated in a second, e.g., clockwise direction, the reconfigurable end-effector 10 may be used with workpieces having convex profiles.

When the second input lever 42 is held in the neutral position and the first input lever 32 is rotated in a counterclockwise direction, the reconfigurable end-effector 10 may be used with workpieces having concave profiles. It is appreciated that rotation of the second input lever 42 in a second, e.g., clockwise direction is limited to avoid interface between the master boom 12 and a workpiece.

As shown, each of the front branches 75 is paired with a corresponding rear branch 85 when mounted on a limb 72, with each pair of front and rear branches 75, 85 configured to translate along the length of the respective limb 72 when the linear locking mechanism 76 is unlocked. The front branch 75 is mounted on the linear locking mechanism 76. The linear locking mechanism 76 includes a ball spline bearing or carrier to ensure smooth positioning of the front branch 75 along the length of the respective limb 72. The limbs 72 are preferably ball spline shafts. The linear locking mechanism 76 is configured to linearly and rotationally lock the front branch 75 onto the spline shaft of the respective limb 72 to prevent rotation under load or lateral movement along the limb 72. The linear locking mechanism 76 is preferably pneumatically activated, is preferably configured to remain in a locked position until unlocked, and is preferably unlocked only when compressed air is injected through a latching nipple 79.

Each rear branch 85 mounts on a yoke 77 having two endplates 78 that couple with the linear locking mechanism 76. The yoke 77 slides along the spline shaft of the respective limb 72 in concert with the linear locking mechanism 76, with the rear branch 85 sliding within the slot 83 formed between beam elements 84 in the guide rails 82. The yoke 77 is free to rotate around the spline shaft of the respective limb 72, allowing the rear branch 85 to rotate independently with respect to the corresponding front branch 75. Rotation of the yoke 77 and associated rear branch 85 is constrained by rotational position of the slot 83 formed between beam elements 84 in the guide rails 82, which is controlled by the second rotary clutch mechanism 40 using the second input lever 42.

Each of the guide rails 82 is formed using a pair of parallel beam elements 84 in one embodiment. By way of example, the beam elements 84 may be I-beams that are joined at proximal ends at the guide rail bracket 44 and joined at distal ends using the end brackets 46, and are spaced with a gap therebetween that forms the slot 83. The rear branches 85 are attached to the limbs 72, preferably orthogonally, and project through the slot 83. The rear branches 85 are configured to rotate with rotation of the guide rails 82, which are preferably linked to rotate in concert with each other through rotation of the second rotary clutch mechanism 40, preferably using the second input lever 42. It is appreciated that the guide rails 82 provide structural support to the rear branches 85.

Figure 3:
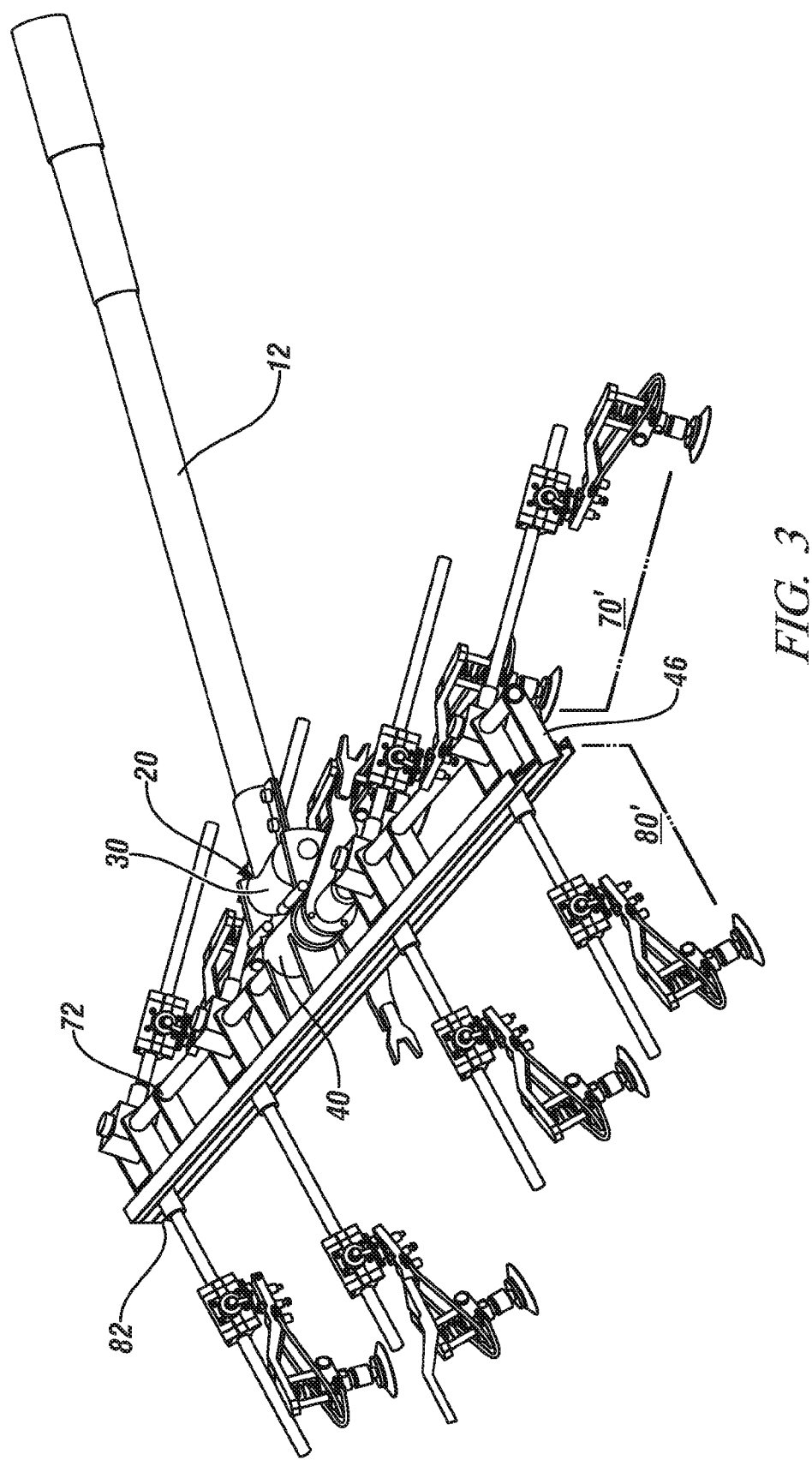
FIG. 3 is a three-dimensional illustration of another embodiment of the reconfigurable end-effector in accordance with the disclosure.

FIG. 3 illustrates another embodiment of the reconfigurable end-effector 10 including the master boom 12, the dual articulation mechanism 20 with first and second rotary clutch mechanisms 30 and 40. The first rotary clutch mechanism 30 attaches between the second rotary clutch mechanism 40 and the master boom 12. The second rotary clutch mechanism 40 is coupled to both the first and second branch assemblies 70' and 80'. In this embodiment, the first branch assembly 70' includes the limbs 72 attached to the second rotary clutch mechanism 40, and the second branch assembly 80' includes the guide rails 82' attached to the limbs 72 and the second rotary clutch mechanism 40. The guide rails 82' are unitary pieces that are attached to the second rotary clutch mechanism 40 and project between the end brackets 46.

Figure 4:
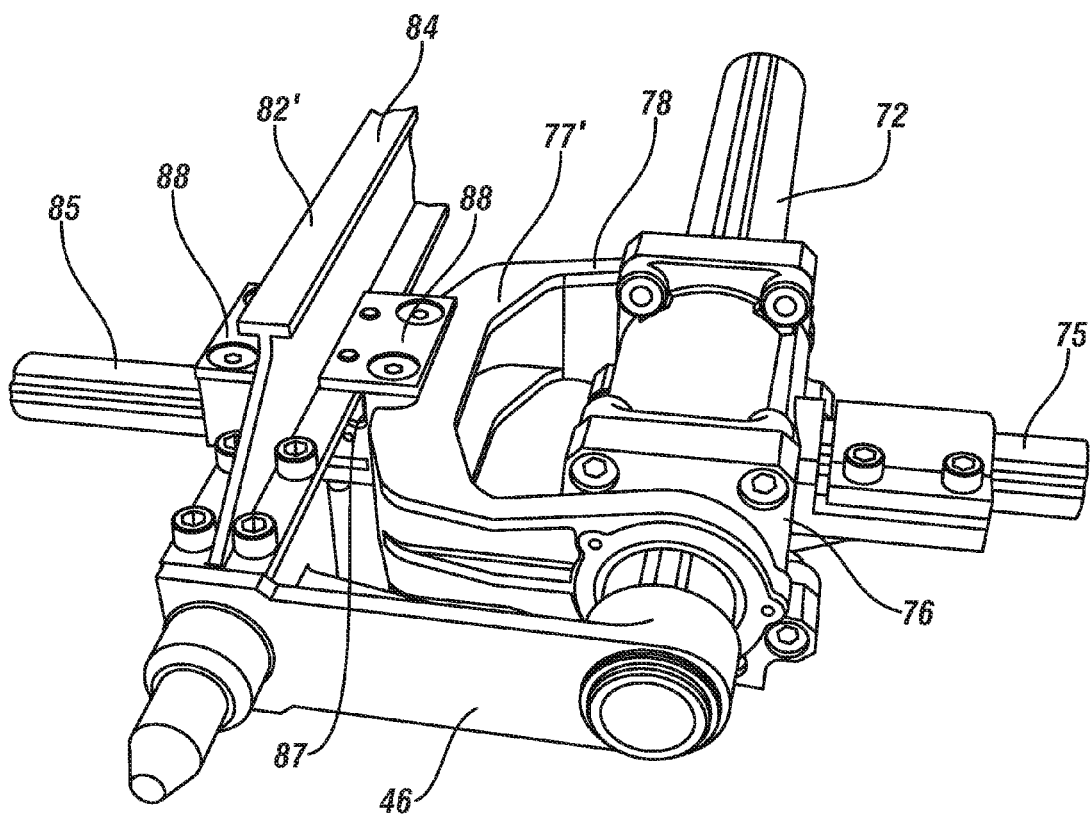
FIG. 4 is a three-dimensional illustration of a portion of another embodiment of the reconfigurable end-effector in accordance with the disclosure.

FIG. 4 illustrates a portion of another embodiment of the reconfigurable end-effector 10, analogous to the embodiment shown with reference to FIG. 1. In this embodiment, the front branch 75 is paired with corresponding rear branch 85 and mounted on limb 72 using linear locking mechanism 76. The rear branch 85 mounts on yoke 77' having two endplates 78 that couple with the linear locking mechanism 76. The yoke 77' slides along the spline shaft of the respective limb 72 in concert with the linear locking mechanism 76. The guide rail 82' is formed using a single beam element 84, which is preferably an I-beam. The beam element 84 of the guide rail 82' is joined to the limb 72 using end bracket 46. The yoke 77' includes a recess portion 87 and retaining slide plates 88 that correspond to the beam element 84. When assembled together, the beam element 84 fits into the recess portion 87 of the yoke 77' and is retained therein by the retaining slide plates 88. Thus, the yoke 77' including the rear branch 85 slides along the beam element 84 that makes up the guide rail 82'. The yoke 77' is free to rotate around the spline shaft of the respective limb 72, allowing the rear branch 85 to rotate independently with respect to the corresponding front branch 75. Rotation of the yoke 77' and associated rear branch 85 is constrained by rotational position of the guide rail 82', which is controlled by the second rotary clutch mechanism 40 using the second input lever 42. The front and rear branches 75, 85 are configured to translate along the length of the respective limb 72 when the linear locking mechanism 76 is unlocked.

Figure 5:
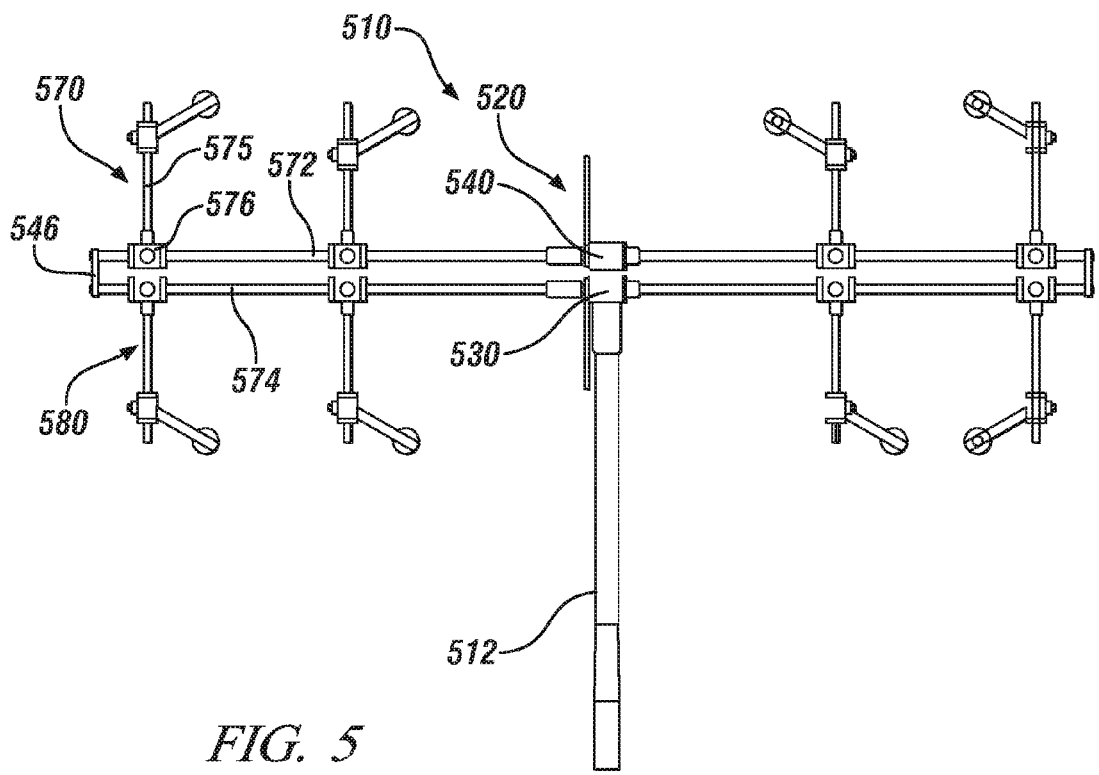
FIG. 5 is a two-dimensional illustration of another embodiment of the reconfigurable end-effector in accordance with the disclosure.

FIG. 5 illustrates another embodiment of the reconfigurable end-effector 510 including the master boom 512, the dual articulation mechanism 520 with first and second rotary clutch mechanisms 530 and 540 coupled to front and rear branch assemblies 570 and 580, respectively. In this embodiment, the first branch assembly 570 includes the first rotary clutch mechanism 530 attached to a pair of first limbs 572, and the second branch assembly 580 includes the second rotary clutch mechanism 540 attached to a pair of second limbs 574. End brackets 546 couple distal ends of contiguous first and second limbs 572 and 574. The limbs 572 and 574 are preferably ball spline shafts. Each of the limbs 572 and 574 includes at least one branch 575 that is mounted thereon using a linear locking mechanism 576. Each branch 575 is configured to be moved independently of the other branches 575. Other elements of this embodiment are analogous to those shown with reference to FIG. 1.

Figure 6:
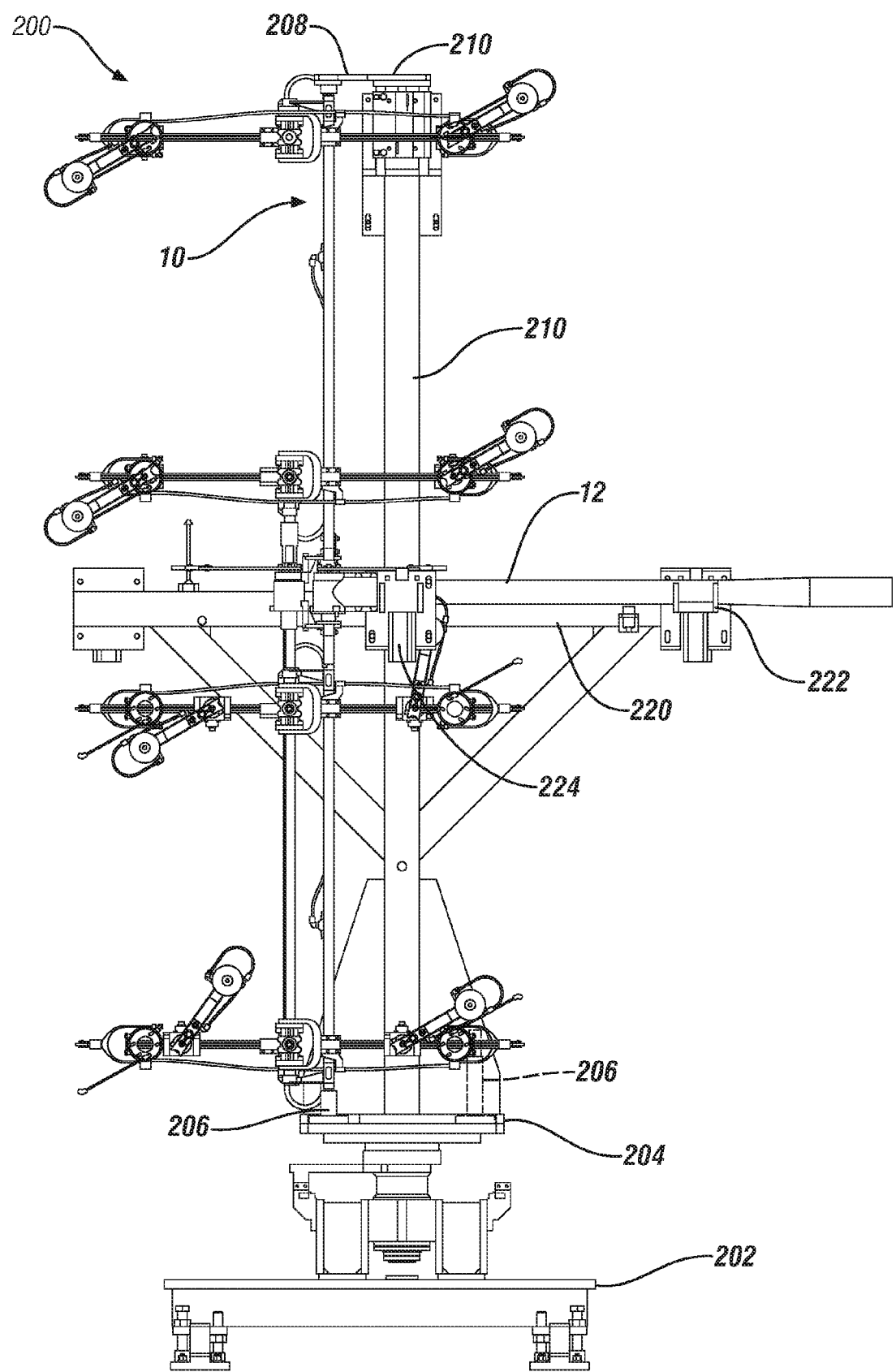
FIG. 6 illustrates a setup stand to facilitate reconfiguration of an exemplary end-effector in accordance with the disclosure.

FIG. 6 illustrates a setup stand 200 to facilitate reconfiguration of an exemplary end-effector 10. The setup stand 200 includes a base 202 on which a vertical arm 210 is assembled. The base preferably includes a pivotable plate 204 having a lower locator bracket 206. In one embodiment, the vertical arm 210 includes an upper locator bracket 208. A horizontal arm 220 is attached to the vertical arm 210. The horizontal arm 220 includes a pair of U-brackets 222 and 224 including pneumatically-actuated clamping mechanisms. The U-brackets 222 and 224 are configured to accommodate the master boom 12 of the end-effector 10.

The vertical height of the horizontal arm 220 is preferably adjustable and the horizontal locations of the U-brackets 222 and 224 are preferably adjustable so the setup stand 200 accommodates the end-effector 10 laid with the master boom 12 in a horizontal position across the U-brackets 222 and 224, with one of the end brackets 46 of the end-effector 10 inserted into or otherwise oriented with the lower locator bracket 206.

When the end-effector 10 is placed and clamped onto the setup stand 200, the first and second branch assemblies 70 and 80 are in upright positions with the limbs 72 and guide rails 82 in vertical positions, and the front and rear branches 75, 85 extending horizontally.

A robotic arm may be employed to configure each of the tool modules 50 to a suitable position defined with reference to an x-axis position, a y-axis position, and a z-axis position. The rotational angle φ about the z-axis of the x-y-z coordinate system 90 and the swivel angle α95 are preferably self-adjustable to permit conformation of each end element 52 of each tool module 50 to a workpiece. The robotic arm may also then interact with the first and second input levers 32 and 42 to articulate the first and second assemblies 70 and 80 of the reconfigurable end-effector 10 to achieve a preferred configuration, including one of a convex, concave or flat configuration.

Each of the tool modules 50, the linear locking mechanisms 76 and the linear/rotary locking mechanism 73 is preferably individually pneumatically activated. Thus, reconfiguration may be accomplished using a common setup tool employing compressed air that connects to the robotic arm.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A reconfigurable end-effector attachable to a robotic arm, comprising:
    a master boom;
    a first branch assembly and a second branch assembly, the first branch assembly including a first longitudinal axis parallel to a second longitudinal axis of the second branch assembly and orthogonal to a longitudinal axis of the master boom;
    a dual articulation mechanism comprising
        a first rotary clutch mechanism attached to the first branch assembly and configured to rotate the first branch assembly about the first longitudinal axis relative to the second longitudinal axis of the second branch assembly, and
        a second rotary clutch mechanism attached to the master boom, the second branch assembly and the first rotary clutch mechanism, the second rotary clutch mechanism configured to simultaneously rotate the first and second branch assemblies about the second longitudinal axis relative to the master boom;
    the first and second branch assemblies each having limbs connected to branches supporting a plurality of tool modules; and
    each tool module including an end element configurable to interact with a workpiece.

2. The reconfigurable end-effector of claim 1, wherein the dual articulation mechanism is configured to articulate the first and second branch assemblies to one of a convex configuration, a concave configuration, and a flat configuration.

3. The reconfigurable end-effector of claim 1, wherein the first and second branch assemblies comprise a spider-frame construction.

4. The reconfigurable end-effector of claim 3, wherein each branch is configured to translate on the corresponding limb.

5. The reconfigurable end-effector of claim 4, wherein each branch is coupled to a linear locking mechanism configured to translate on the corresponding limb.

6. The reconfigurable end-effector of claim 3, wherein each tool module is configured to translate on the corresponding branch.

7. The reconfigurable end-effector of claim 6, wherein each tool module comprises a linear/rotary locking mechanism configured to translate on the corresponding branch.

8. The reconfigurable end-effector of claim 1, wherein the first branch assembly comprises a first spider-frame construction comprising first limbs connected to a plurality of front branches supporting tool modules and the second branch assembly comprises a second spider-frame construction comprising second limbs connected to a plurality of rear branches supporting tool modules.

9. The reconfigurable end-effector of claim 8, further comprising:
    each of the front branches paired to a corresponding one of the rear branches;
    each of the front branches coupled to a linear locking mechanism configured to translate on the corresponding limb;
    each of the rear branches coupled to a yoke coupled to the linear locking mechanism of the corresponding front branch; and
    the yoke configured to rotate about a corresponding first limb.

10. The reconfigurable end-effector of claim 1, wherein each tool module is configurable to a position defined with reference to an x-axis position, a y-axis position, a z-axis position, and a rotational angle $\phi$ about the z-axis.

11. The reconfigurable end-effector of claim 1, wherein each end element is swivelably attached to the corresponding tool module at a swivel angle cc that conforms to the workpiece.

12. A reconfigurable end-effector attachable to a robotic arm, comprising:
    a first branch assembly including guide rails and first branches supporting a first plurality of tool modules;
    a second branch assembly including limbs arranged parallel to the guide rails, the limbs connected to second branches supporting a second plurality of tool modules;
    the first branch assembly including a first longitudinal axis parallel to a second longitudinal axis of the second branch assembly and orthogonal to a longitudinal axis of a master boom; and
    the master boom attachable to a robotic arm and coupled to a dual articulation mechanism comprising a first clutch and a second clutch, the second clutch attached to and configured to rotate the first branch assembly about the first longitudinal axis relative to the second longitudinal axis of the second branch assembly, and the first clutch attached to the second clutch and the master boom and configured to rotate the first and second branch assemblies about the second longitudinal axis relative to the master boom.

13. The end-effector of claim 12, wherein the first branch assembly comprises a plurality of linear locking mechanisms coupled to the first branches and arranged on the limbs to rotate therewith and translate thereon.

14. The end-effector of claim 13, wherein each of the second branches are coupled to a yoke coupled to the linear locking mechanism of the corresponding front branch and the yoke configured to rotate around the corresponding limb.

15. The end-effector of claim 12, wherein each tool comprises a suitable position defined with reference to an x-axis position, a y-axis position, a z-axis position, and a rotational angle $\phi$ about the z-axis.

16. The end-effector of claim 12, wherein each tool module comprises an end element configured to interact with a workpiece and swivelably attached to the corresponding tool module at a swivel angle $\alpha$ that conforms to the workpiece.

17. A reconfigurable end-effector attachable to a robotic arm, comprising:
    a master boom attachable to a robotic arm and coupled to a dual articulation mechanism comprising a first rotary clutch attached to and configured to rotate a first branch assembly about a first longitudinal axis relative to a second branch assembly, and a second rotary clutch attached to the second branch assembly and configured to rotate the first and second branch assemblies about a second longitudinal axis orthogonal to a longitudinal axis of the master boom;

said first branch assembly including guide rails and first branches supporting a first plurality of tool modules;

said second branch assembly including limbs arranged parallel to the guide rails, the limbs connected to second branches supporting a second plurality of tool modules; and each tool module including an end element swivelably attached thereto to interact with a workpiece.

* * * * *